United States Patent [19]

Johnson et al.

[11] 4,319,668
[45] Mar. 16, 1982

[54] PUSH-PULL CALIPER

[75] Inventors: Roger R. Johnson, Union Lake; Charles W. Kleinhagen, Jr., Livonia; Richard F. Neuman, Farmington; Peter S. Winckler, Birmingham, all of Mich.

[73] Assignee: Eaton Corporation, Cleveland, Ohio

[21] Appl. No.: 106,617

[22] Filed: Dec. 26, 1979

[51] Int. Cl.³ .......................................... F16D 55/224
[52] U.S. Cl. ................................ 188/72.4; 188/73.39; 188/73.43; 188/93
[58] Field of Search ..................... 188/72.4, 73.3, 73.6

[56] References Cited

U.S. PATENT DOCUMENTS

| 4,002,226 | 1/1977 | Rainbolt | 188/73.3 |
|---|---|---|---|
| 4,046,231 | 9/1977 | Ohori | 188/73.3 |
| 4,061,209 | 12/1977 | Gee | 188/73.3 |
| 4,068,745 | 1/1978 | Haraikawa | 188/73.3 |
| 4,106,595 | 8/1978 | Kimura | 188/73.3 |
| 4,194,597 | 3/1980 | Evans | 188/73.3 |
| 4,200,173 | 4/1980 | Evans | 188/73.3 |

Primary Examiner—Joseph F. Peters, Jr.
Assistant Examiner—John A. Carroll
Attorney, Agent, or Firm—Charles H. Grace; D. L. Wood

[57] ABSTRACT

A vehicular disc brake in which the backing plate of the inboard brake pad assembly includes holes which capture guide rails carried by spaced arm portions of the torque plate and the backing plate of the outboard brake pad assembly is pinned to the outboard web of the caliper. The various clearances are selected such that, upon application of the brake, the inboard backing plate pulls on one of the guide rails to transmit the braking torque exerted on the inboard pad assembly to one arm of the torque plate and the caliper pushes against the other guide rail to transmit the braking torque exerted on the outboard pad assembly to the other arm of the torque plate.

7 Claims, 8 Drawing Figures

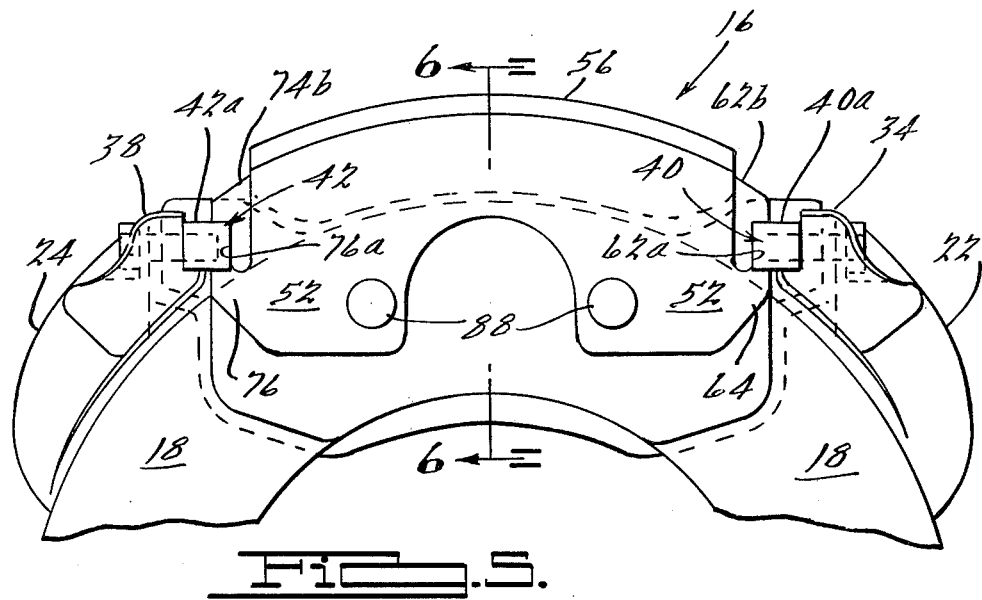
FIG. 5.
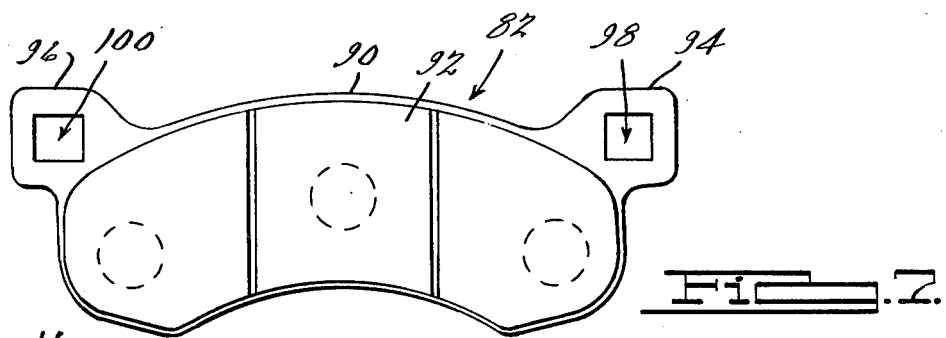
FIG. 2.
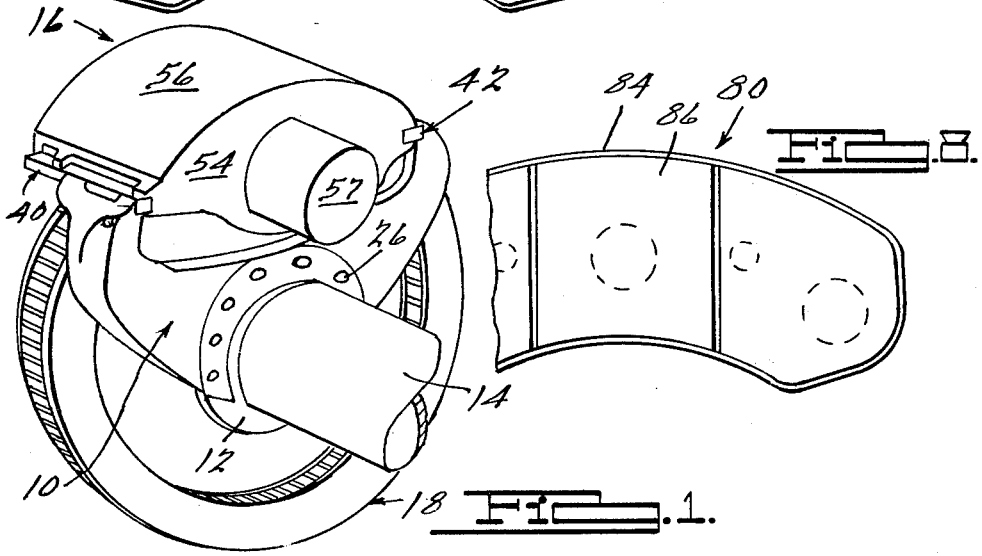
FIG. 8.
FIG. 1.

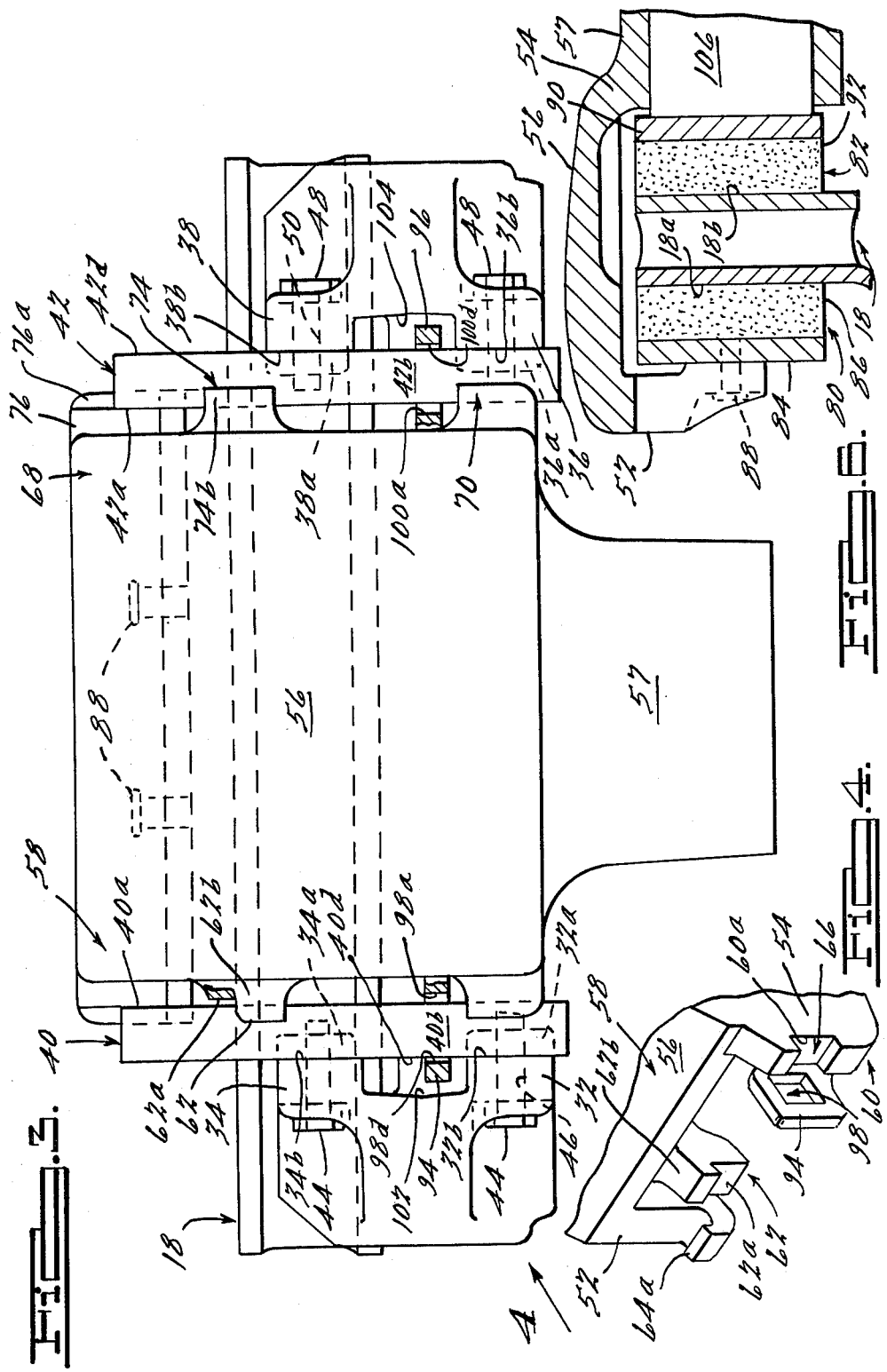

PUSH-PULL CALIPER

BACKGROUND OF THE INVENTION

This invention relates to disc brakes and, more particularly, to vehicular disc brakes of the sliding caliper type.

In a vehicular disc brake of the sliding caliper type, the brake assembly is fixed to the axle assembly of the related vehicle by a torque plate which includes spaced arm portions, and the caliper slides axially on rail means defined at the free ends of the spaced arm portions. The caliper (or the rail means) carries brake pad assemblies which, when the brake is applied, frictionally engage opposite annular faces of a brake rotor secured to the vehicle wheel assembly. The torque exerted on the brake pads during the braking operation is transmitted to and absorbed by the torque plate. The magnitude of the torque exerted on the brake pad during the braking operation, particularly in a heavy-duty truck application, is significant. It is important that the torque plate be strong enough to comfortably absorb the torque; and it is equally important that the weight and size of the torque plate be minimized for fuel economy and space considerations.

SUMMARY OF THE INVENTION

The primary object of the present invention is to provide a heavy-duty vehicular disc brake of minimal size and weight and maximal torque absorbing capacity.

A more specific object is to provide a heavy-duty vehicular disc brake assembly in which the size and weight of the torque plate are minimized without detracting from the torque absorbing capacity of the torque plate.

The invention disc brake is of the sliding caliper type in which the caliper is mounted at its opposite ends on the free ends of spaced arm portions of the torque plate and in which, upon brake actuation, one of the brake pad assemblies is moved into frictional braking contact with an annular braking surface on the rotor whereafter, with continued actuation, the caliper slides on the arm portions of the torque plate to bring the other pad assembly into frictional braking contact with the opposite annular braking surfaces on the rotor. According to an important feature of the invention, the brake pad assemblies are mounted relative to the caliper and relative to the torque plate such that, upon frictional braking contact of the pad assemblies with the rotor, the torque thereby exerted on one of the pad assemblies is transmitted to the torque plate as a pull on one of the arm portions of the torque plate and the torque thereby exerted on the other pad assembly is transmitted to the torque plate as a push on the other arm portion of the torque plate. The braking torque is thus effectively split between the two arm portions of the torque plate, thereby allowing the size and weight of each arm portion of the torque plate to be reduced without reducing the torque absorbing capacity of the torque plate.

According to a further feature of the invention, one of the brake pad assemblies is carried by the caliper and the caliper is arranged to push against one of the torque plate arm portions, and the other brake pad assembly is arranged to pull directly on the other torque plate arm portion.

In the disclosed embodiment of the invention, the backing plate of the outboard brake pad assembly is carried by the outboard web portion of the caliper; the caliper includes an abutment surface which presses against a guide rail carried by one of the torque plate arm portions; and the backing plate of the inboard brake pad assembly includes an end portion which captures, and pulls directly on, a guide rail carried by the other arm portion of the torque plate.

These and other objects, features and advantages of the invention will be apparent from the following detailed description of a preferred embodiment of the invention and from the drawings.

BRIEF DESCRIPTION OF THE DRAWINGS

FIG. 1 is a perspective view of the invention disc brake assembly;

FIG. 3 is a top view of the disc brake assembly of FIG. 1;

FIG. 4 is a fragmentary perspective view looking in the direction of the arrow 4 in FIG. 3;

FIG. 5 is an elevational view looking from outboard to inboard with respect to the axle assembly;

FIG. 6 is a cross sectional view taken on line 6—6 of FIG. 5;

FIG. 7 is an elevational view of the inboard brake pad assembly; and

FIG. 8 is an elevational view of the outboard brake pad assembly.

DETAILED DESCRIPTION OF THE PREFERRED EMBODIMENT

Figure 2:
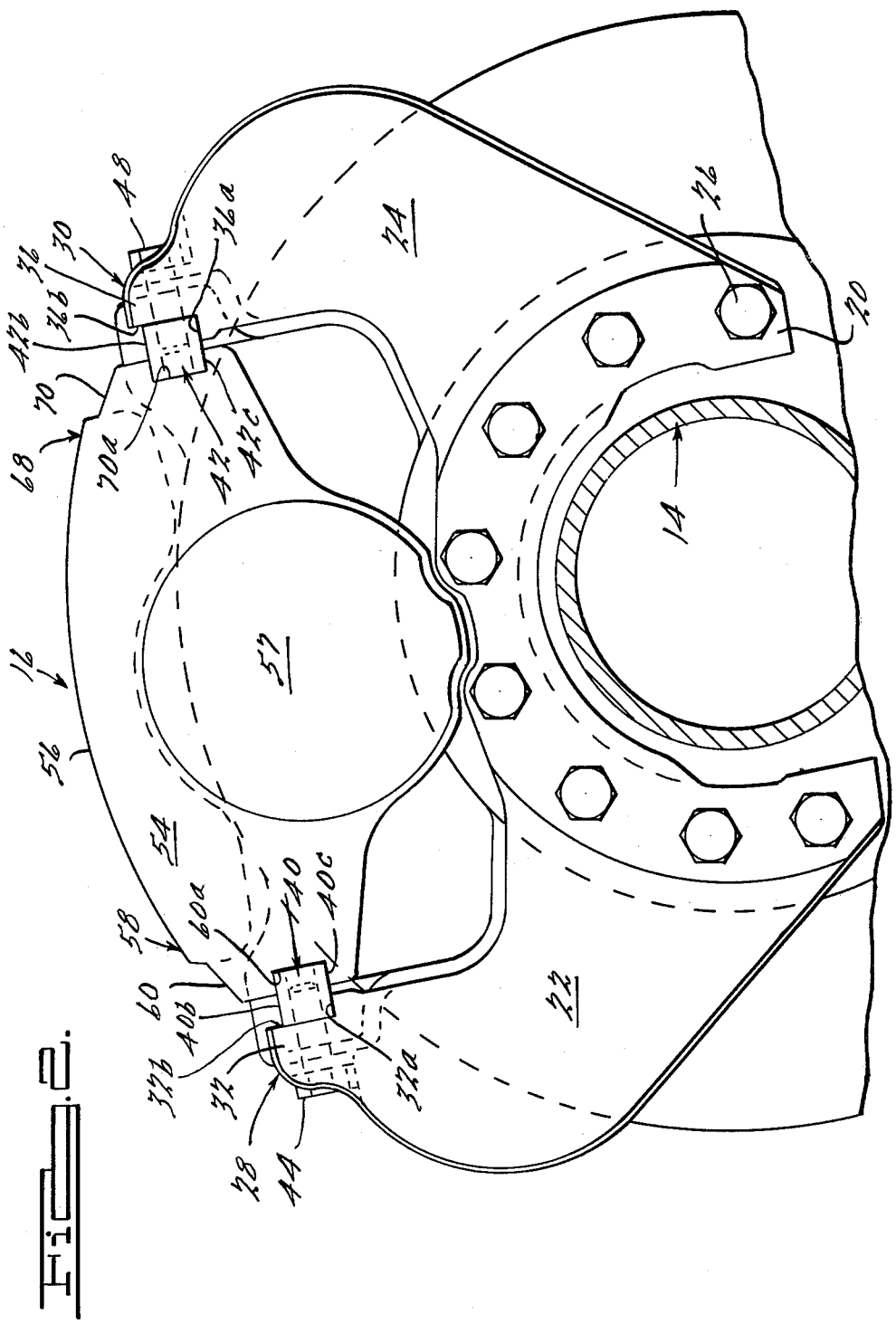
FIG. 2 is an elevational view of the invention disc brake assembly looking from inboard to outboard with respect to the related vehicular axle assembly.

The disc brake seen in perspective in FIG. 1, broadly considered, includes a torque plate 10 secured to a flange 12 of a vehicular axle housing 14; a caliper 16 carried by the torque plate; and a rotor 18 embraced by the caliper and secured to a wheel (not shown) of the vehicle.

Torque plate 10, as best seen in FIGS. 2 and 3, is formed as a unitary ferrous casting and includes a mounting portion 20 and spaced arm portions 22 and 24. Mounting portion 20 has a generally horseshoe configuration and is adapted to be secured to axle flange 12 by a plurality of circumferentialy spaced bolts 26. Arm portions 22, 24 extend radially outwardly from mounting portion 20 and terminate in free end portions 28, 30. Each free end portion is bifuricated to provide mounting pad portions 32, 34 and 36, 38; and each pad portion is notched to provide generally horizontal mounting surfaces 32a, 34a, 36a, 38a and generally vertical mounting surfaces 32b, 34b, 36b, 38b. A steel guide rail or key 40, of essentially square transverse cross section, is positioned in the notches defined by pad portions 32, 34 and another steel guide rail 42 is positioned in the notches defined by pad portions 36, 38. Bolts 44 pass through bores 46 in pad portions 32, 34 for threaded engagement with spaced, threaded bores in rail 40 to releasably seat rail 40 against vertical mounting surfaces 32b, 34b and horizontal mounting surfaces 32a, 34a. Bolts 48 pass through bores 50 in pad portions 36, 38 for threaded engagement with spaced, threaded bores in rail 42 to reasably seat rail 42 against vertical mounting surfaces 36b, 38b and horizontal mounting surfaces 36a, 38a.

Caliper 16 comprises a unitary ferrous casting mounted for axially sliding movement on rails 40, 42. Caliper 16, in transverse cross section (FIG. 6) has a generally C-shaped configuration including an outboard web portion 52, an inboard web portion 54, and a central or bridge portion 56. An actuator housing portion 57 is cast integral with inboard web portion 54. Caliper 16, as viewed in FIGS. 2 and 5, extends in a generally arcuate configuration from rail 40 to rail 42. The ends of caliper 16 adjacent rails 40, 42 are configured to slidably guide on the rails. Specifically, and as best seen in FIG. 4, caliper end portion 58 (the end adjacent rail 40) is configured to provide a guide portion 60, an abutment portion 62, and a guide portion 64. Guide portion 60 comprises an integral extension of inboard web portion 54 and defines a groove 66 adapted to slidably embrace rail 40 with the inner surface of the groove defining an abutment surface 60a adapted to engage the inner surface 40a of rail 40. Abutment portion 62 comprises an integral finger-like extension of central caliper portion 56 and defines an abutment surface 62a, coplanar with abutment surface 60a and adapted to engage inner rail surface 40a, and a central guide portion 62b overlying rail 40 and guiding on upper rail surface 40b. Guide portion 64 comprises an integral extension of outboard web portion 52 and defines a guide surface 64a adapted to guide on the under surface 40c of rail 40. Caliper end portion 68 (the end adjacent rail 42) is similarily configured to provide an inboard guide portion 70 defining a groove 72 and an abutment surface 70a, an abutment portion 74 defining an abutment surface 74a and a central guide portion 74b, and an outboard guide portion 76 defining a guide surface 76a.

As best seen in FIG. 6, a caliper 16 embraces rotor 18 with the outboard brake pad assembly 80 interposed between outboard caliper web portion 52 and the outboard annular rotor braking surface 18a, and the inboard brake pad assembly 82 interposed between inboard caliper web portion 54 and the inboard annular rotor braking surface 18b.

Outboard brake pad assembly 80 (see also FIG. 8) includes a backing plate 84, and a brake pad 86 of similar shape and dimensions bonded to plate 84. Plate 84 is positioned against the inboard face of outboard caliper web portion 52 by a pair of pins 88 passing through aligned holes in web portion 52 and plate 84.

Inboard brake pad assembly 82 (see also FIG. 7) includes a backing plate 90 and a brake pad 92 bonded to plate 90. Backing plate 90 includes end portions of "ears" 94, 96 defining generally square holes 98, 100 adapted to pass or "capture" rails 40, 42 respectively. End portions 28, 30 of torque plate arm portions 22, 24 are cut away at 102, 104 to provide clearance for backing plate end portions 94, 96.

Three tolerance or clearance dimensions are important for the optimum operation of the invention disc brake. Specifically: (1) the distance between the outer surface 98d of hole 98 and the outer surface 100d of hole 100 is slightly greater than the distance between the outer surface 40d of rail 40 and the outer surface 42d of rail 42 so that, in assembled relation, only small tolerance gaps are presented between the outer rail surfaces 40d, 42d and outer hole surfaces 98d, 100d; (2) holes 98, 100 are horizontally oversized with respect to rails 40, 42 so as to provide a significant gap between the inner rail surfaces 40a, 42a and the inner hole surfaces 98a, 100a; and (3) the caliper dimension between abutment surfaces 60a, 70a, and 62a, 74a is selected to provide a clearance between the caliper abutment surfaces and the inner rail surfaces that is greater than the clearance between outer hole surfaces, 98d, 100d and outer rail surfaces 40d, 42a but less than the clearance between inner rail surfaces 40a, 42a and inner hole surfaces 98a, 100a. For example, the small tolerance gaps between the outer rail surfaces and the outer hole surfaces may approximate ten thousandths of an inch; the large gaps between the inner rail surfaces and the inner hole surfaces may approximate seventy thousandths of an inch; and the clearance between the caliper abutment surfaces and the inner rail surfaces may approximate twenty thousandths of an inch.

An actuator piston 106, slidably mounted in actuator housing portion 58, bears against the inboard face of backing plate 90. Upon actuation of the brake, piston 106 presses against backing plate 90 to press pad 92 against inboard rotor braking surface 18b and thereby slide the caliper inboard, or to the right as viewed in FIG. 6, on rails 40, 42 to press outboard pad 86 against outboard rotor braking surface 18a. As the pads brakingly engage the turning rotor, a substantial torque is thereby exerted on the brake pad assemblies. If the rotor is turning counterclockwise as viewed in FIG. 2, the brake pad assemblies, together with the caliper, tend to move counterclockwise about the central axis of the axle assembly. As the inboard pad assembly moves counterclockwise, or to the left as seen in FIG. 3, the outer surface 100d of hole 100 moves toward the outer surface 42d of rail 42, the inner surface 98a of hole 98 moves toward the inner surface 40a of rail 40, and abutment surfaces 60a, 62a, on the caliper move toward inner rail surface 40a. Since both the gap between inner rail surfaces 40a and inner hole surfaces 98a and the gap between inner rail surface 40a and abutment surface 60a, 62a exceed the tolerance gap between outer rail surface 42d and outer hole surfaces 100d, outer hole surface 100d quickly snugs into abutting engagement with outer rail surface 42d while inner hole surface 98a and caliper abutment surfaces 60a, 62a remains spaced from inner rail surface 40a. The braking torque exerted on inner brake pad assembly 80 is thus totally transmitted to and absorbed by rail 42 and, thereby, torque plate arm portion 24.

Following snugging of hole surface 100d against outer rail surface 42d, the caliper and outboard pad assembly (which are fixed together by pins 88) continue to move to the left as viewed in FIG. 3 to bring abutment surfaces 60a, 62a into engagement with inner rail surface 40a. The braking torque exerted on outer brake pad assembly 80 is thus totally transmitted to and absorbed by rail 40 and, thereby, torque plate arm portion 22.

It will be apparent that braking of the rotor with the latter turning in a clockwise direction as viewed in FIG. 2 will cause the braking torque exerted on the inboard pad assembly to be transmitted to rail 40 while causing the braking torque exerted on the outboard pad assembly to be transmitted to rail 42. When braking in either direction, the described arrangement functions to transmit the braking torque exerted on one of the pad assemblies to the torque plate as a pull on one of the torque plate arm portions while transmitting the braking torque exerted on the other pad assembly to the torque plate as a push on the other torque plate arm portion.

Since the braking torque, in either direction of rotation, is effectively split between the two arm portions of the torque plate, the size and weight of each arm portion may be reduced without reducing the torque absorbing capacity of the torque plate. Whereas, for purposes of simplicity, the torque plate has been described throughout the specification as absorbing the braking torque, it will be understood that, when installed as part of a complete vehicular system, the torque plate, rather than providing the utlimate absorption of the torque, would actually serve to transmit the torque to the frame of the vehicle via the axle assembly and the vehicle suspension system.

While a preferred embodiment of the invention has been illustrated and described in detail, it will be apparent that various charges may be made in the preferred embodiment without departing from the scope or spirit of the invention.

What is claimed is:

1. A disc brake for use with a motor vehicle axle assembly, said brake comprising:
   (A) a rotor defining a pair of spaced annular braking surfaces;
   (B) a torque plate having a mounting portion adapted to be fixedly secured to the axle assembly and two spaced arm portions;
   (C) rail means associated with each of said arm portions and extending generally parallel to the axis of the axle assembly;
   (D) a caliper mounted at its opposite ends on said rail means for sliding movement relative to said torque plate in a direction generally parallel to the axis of the axle assembly;
   (E) a pair of brake pad assemblies associated with said caliper and disposed on opposite sides of said rotor, each of said pad assemblies including a backing plate and a brake pad carried by the backing plate with the backing plate of one of said pad assemblies including end portions which each slideably guide on a respective one of said rail means;
   (F) actuator means operative to move the pad assembly disposed on one side of said rotor into frictional braking contact with one annular braking surface on said rotor whereafter, with continued actuation of said actuator means, said caliper slides relative to said torque plate to bring the pad assembly disposed on the other side of said rotor into frictional braking contact with the other annular braking surface on said rotor; and
   (G) means operative in response to frictional braking contact of said pad assemblies with said rotor
      (1) to bring a torque transmitting surface on one of said end portions into engagement with an adjacent surface of the rail means associated with one of said arm portions to cause the braking torque exerted on said one pad assembly to be transmitted to said one arm portion; and
      (2) to cause the braking torque exerted on the other pad assembly to be transmitted to the other arm portion.

2. A disc brake for use with a motor vehicle axle assembly, said brake comprising:
   (A) A rotor defining a pair of spaced annular braking surfaces;
   (B) a torque plate having a mounting portion adapted to be fixedly secured to the axle assembly and two spaced arm portions;
   (C) rail means rigid with each of said arm portions and extending generally parallel to the axis of the axle assembly;
   (D) a caliper mounted at its opposite ends on said rail means for sliding movement on said rail means in a direction generally parallel to the axis of the axle assembly;
   (E) a pair of brake pad assemblies associated with said caliper and disposed on opposite sides of said rotor, each of said pad assemblies including a backing plate and a brake pad carried by the backing plate with the backing plate of one of said pad assemblies including end portions which each slideably guide on a respective one of said rail means;
   (F) actuator means operative to move the pad assembly disposed on one side of said rotor into frictional braking contact with one annular braking surface on said rotor whereafter, with continued actuation of said actuator means, said caliper slides on said rail means to bring the pad assembly disposed on the other side of said rotor into frictional braking contact with the other annular braking surface on said rotor; and
   (G) means operative in response to frictional braking contact of said pad assemblies with said rotor
      (1) to bring a torque transmitting surface on one of said end portions into engagement with an outer surface of the rail means associated with one of said arm portions to cause the braking torque exerted on said one pad assembly to be transmitted to said torque plate as a pull on said one arm portion; and
      (2) to cause the braking torque exerted on the other pad assembly to be transmitted to said torque plate as a push on the other arm portion.

3. A disk brake assembly according to claim 2 wherein:
   L. each of said end portions defines a torque transmitting surface as described;
   M. said end portions define holes which pass the respective rail means so that the rail means are totally captured by the backing plate of said one pad assembly and
   N. said torque transmitting surfaces comprise the outer portion of the edge surface of said holes.

4. A disc brake assembly according to claim 2, wherein:
   L. the backing plate of the other of said pad assemblies is carried by said caliper and
   M. said caliper includes an abutment surface juxtaposed to an inner surface of the rail means associated with said other arm portion and arranged to engage that inner surface in response to braking of said rotor with the latter rotating in said given direction to cause the braking torque exerted on that pad assembly to be transmitted to the torque plate as a push on the rail means associated with said other arm portion.

5. In a vehicular disc brake of the type including a rotor defining a pair of spaced annular braking surfaces, a torque plate having a mounting portion adapted to be fixedly secured to the axle assembly of the associated vehicle and further having two spaced arm portions, rail means rigid with each of said arm portions and extending generally parallel to the axis of the vehicle axle assembly, a caliper mounted and its opposite ends for sliding movement on the rail means, and a pair of brake pad assemblies associated with the caliper and mounted on opposite sides of the rotor; the improvement wherein:
   A. each of said pad assemblies includes a backing plate and a brake pad carried by the backing plate;

B. the backing plate of one of said pad assemblies engages with rail means and is arranged to pull on one of said rail means in response to braking of said rotor with the latter rotating in a given direction; and C. the backing plate of the other pad assembly is carried by the caliper and the caliper is arranged to push against the other of said rail means in response to braking of said rotor with the latter rotating in said given direction.

6. A disc brake according to claim 5 wherein:

D. said one backing plate defines holes at its opposite ends which pass said rail means to capture said rail means; and E. said caliper defines abutment surfaces at each of its ends juxtaposed to the inner surfaces of said rail means.

7. A disc brake according to claim 6 wherein:

F. said one pad assembly is the inboard pad assembly and said other pad assembly is the outboard pad assembly.

* * * * *